Jan. 19, 1943.  B. D. MICKEY  2,308,993
DYNAMO CIRCUIT
Filed Feb. 21, 1941   2 Sheets-Sheet 1

Inventor:
Bruce D. Mickey,
by Harry E. Dunham
His Attorney.

Jan. 19, 1943.   B. D. MICKEY   2,308,993
DYNAMO CIRCUIT
Filed Feb. 21, 1941   2 Sheets—Sheet 2

Inventor:
Bruce D. Mickey.
by Harry E. Dunham
His Attorney.

Patented Jan. 19, 1943

2,308,993

UNITED STATES PATENT OFFICE 2,308,993

DYNAMO CIRCUIT

Bruce D. Mickey, Schenectady, N. Y., assignor to General Electric Company, a corporation of New York Application February 21, 1941, Serial No. 379,966

11 Claims. (Cl. 172—239)

This invention relates to dynamo circuits and more particularly to a new and improved circuit for giving a generator a predetermined variable voltage characteristic with increases in load. This characteristic is such that the voltage stays approximately constant for normal values of current and then changes rapidly during large increases in current. The change may be either an increase or a decrease.

One of the most common applications for such a voltage decreasing circuit is to the generator for energizing the main motors on an electric shovel. As long as everything is functioning properly, generator voltage is maintained. If the scoop strikes a rock, the load current builds up to the point where the generator loses its voltage, the motor stalls without any possible further increase in current, and no harm is done. Some other applications are to generators for electric dredges, the auxiliaries on a blooming mill and even electric welding.

In accordance with my invention I provide what, in effect, constitutes a specially amplified compounding means for rapidly varying the generator net excitation. The amplification has, in effect, at least two stages, one of which is an auxiliary dynamo-electric machine in the form of a series exciter and another of which is an instantaneously acting non-linear impedance.

An object of the invention is to provide a new and improved dynamo system.

Another object of the invention is to provide a novel, simple, and reliable regulating circuit for a direct-current generator.

The invention will be better understood from the following description taken in connection with the accompanying drawings and its scope will be pointed out in the appended claims.

Figure 1:
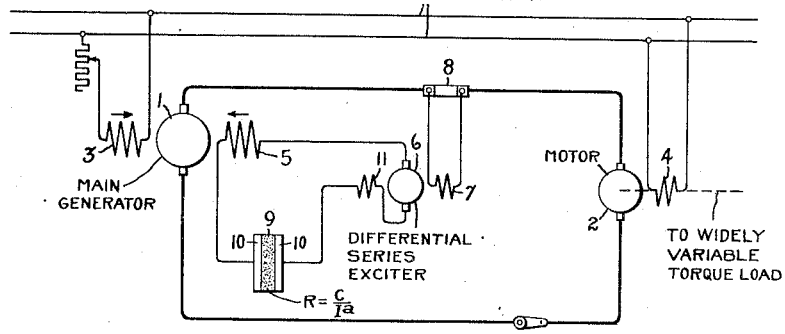
Figure 2:
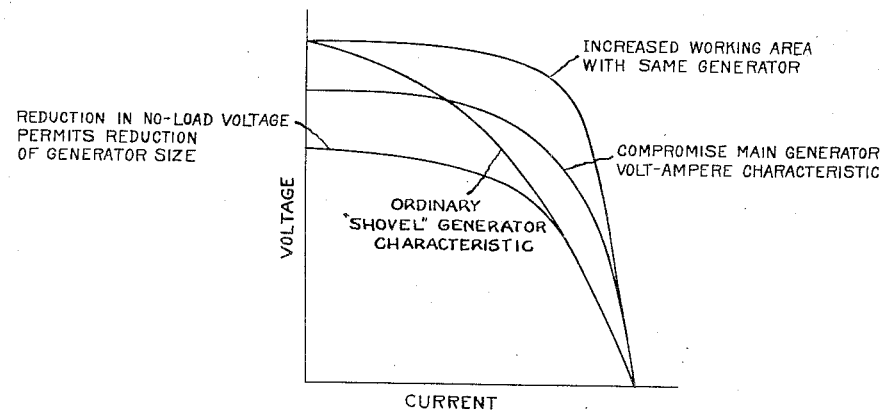
Figure 3:
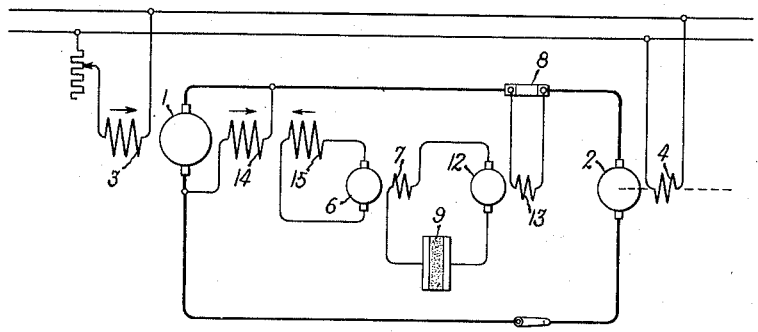
Figure 4:
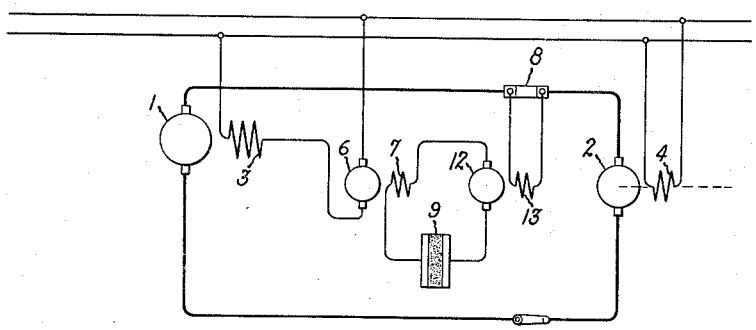
Figure 5:
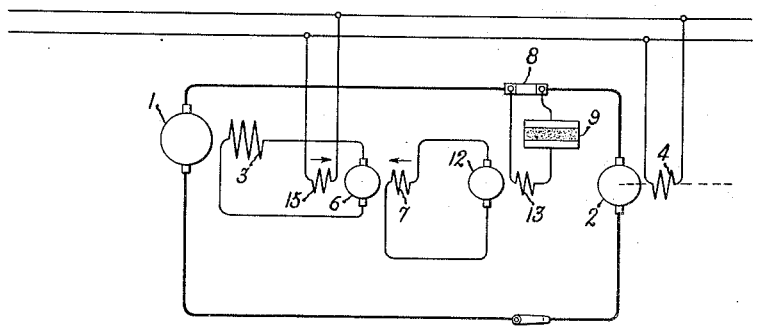

In the drawings Fig. 1 illustrates diagrammatically a preferred embodiment of the invention, Fig. 2 shows the volt-ampere characteristic of the main generator, which is produced by my invention as contrasted with the characteristic of an ordinary shovel generator, and Figs 3, 4 and 5 show modifications.

Referring now to Fig. 1, I show by way of example a main generator 1 connected to supply operating current to a motor 2 which drives a widely variable load, such as the scoop of an electric shovel, and which consequently is occasionally subject to being stalled by excessively high values of load. The main generator 1 has a main field winding 3 and the motor 2 has a field winding 4. They are shown separately energized by any suitable source of direct current, such as from a common excitation circuit energized by a so-called house exciter. However, the generator could be self- or shunt-excited, if desired. The main generator is also provided with an auxiliary field winding 5 which is connected to be energized by a series exciter 6 having a field winding 7 connected to be responsive to the current supplied by the main generator to the motor 2. In cases where this current is very large it may not be desirable to have the winding 7 connected directly in series with the main generator and the motor and consequently it is shown connected indirectly in series therewith by means of a shunt 8. When the auxiliary field winding 5 opposes the main field winding the exciter is known as a differential series exciter. However, by merely reversing the connections the auxiliary field winding will aid the main field winding so as to give an overcompounding effect.

In order to accentuate the action of the series exciter there is connected in series between this exciter and the field winding 5 an inverse or negative impedance-current characteristic element in the form of a piece of material 9 which has the property of being a conductor at one potential and substantially an insulator at a lower potential. This change in conductivity occurs without time lag even with the application of the steepest impulses. The conduction of current through it is similar to the conduction through a copper wire or other conductor. The current flow through it is best expressed by the equation $RI^a = C$ in which R is its resistance, I is the current through it, $a$ is an exponent normally less than unity which is determined by the composition of the material and the controls employed in its manufacture and C is a constant which is determined by its physical dimensions. In disks of this material which have been produced commercially the current varies approximately as the 3.65 power of the applied potential. Thus, if the potential should increase sixteen times, the current increases 25,000 times. Its composition and method of manufacture are described and claimed in Patent 1,822,742, granted September 8, 1931, on an application of K. B. McEachron and assigned to the assignee of the present application. In appearance it is a dense ceramic material, black in color, and having a strength not greatly different from granite. It will operate in any cooling medium, such as oil, if the service requires the continuous dissipation of heat.

In order that good electrical connection may be made to the sides of a disk of the material 9 it is preferably placed between two circular metal plates 10 whose surfaces are in engagement with the surfaces of the material.

Under certain circumstances or to obtain certain desired results, it may be desirable to add a series field 11 on the exciter. The main field 3 may also be provided with a conventional adjusting rheostat.

The operation of Fig. 1 is as follows. At no load the generator operates like an ordinary separately-excited machine and produces rated terminal voltage at rated speed. When the motor 2 is connected to the generator and the motor is lightly loaded the energization of the field winding 5 will be very small by reason of the small generator load current and the relatively extremely high resistance of the element 9. However, as the load current increases the exciter voltage increases thereby increasing the current through the differential field winding 5 and at the same time the resistance 9 decreases so that the increase in current in the differential winding 5 takes place more and more rapidly in relation to increases in the main generator load current. Consequently, the net excitation and voltage of the main generator rapidly decrease until at a predetermined critical value of current the voltage will fall to zero. By properly proportioning the elements of the system this critical value can be made to fall within the safe maximum current limit for either the motor 2 or the generator 1 or both.

In an ordinary shovel generator the voltage drops off at more nearly the same rate at all currents. This is shown in Fig. 2 by the curve labeled "Ordinary 'shovel' generator characteristic." The effect of my invention on the characteristic of the same generator which produced the ordinary characteristic by conventional differential compounding means is shown by the uppermost curve. It will be observed that this curve has the same maximum current and voltage values but that the voltage holds up better with increases in load until nearly full load is reached whereupon the voltage falls off rapidly. This results in an increased working area under the curve in comparison with the ordinary characteristic so that the same generator may be made to produce a greater watt output with complete safety through the use of this invention. However, if desired, my differential compounding circuit may be so adjusted that it has the same slope at its stalling end as has the ordinary characteristic. However, by reason of the fact that the curvature changes more rapidly when my invention is used the effect will be to reduce the no-load voltage, thus permitting the use of a smaller generator while maintaining substantially the same maximum output as is obtained with the ordinary shovel generator characteristic. This lower no-load voltage characteristic is illustrated by the lowermost curve. In practice it is usually found best to adopt a compromise characteristic which is shown in the drawing and is labeled "Compromise main generator volt-ampere characteristic." This characteristic results in a somewhat lower no-load voltage than is produced by the ordinary characteristic while at the same time it yields a greater maximum power output.

With large-size main generators the differential field current may be so high that it is difficult to provide a reasonably sized non-linear resistor 9 which will dissipate the necessary amount of heat to prevent its becoming overheated. In such cases the circuit may be modified in a number of ways as shown in Figs. 3, 4 and 5. In Fig. 3 a pilot exciter 12 has been provided for the differential series exciter 6. This pilot exciter has a field winding 13 which is connected across the shunt 8 and its armature is connected to energize the field winding 7 for the differential exciter 6. The non-linear resistor 9 is connected in series with the field winding 7 of the differential exciter instead of being connected in its armature circuit and as the field current of this machine will be very much less than its armature current the heating losses in the resistor 9 may be materially reduced.

In this figure the main generator is also provided with a shunt field winding 14 for providing a certain amount of self-excitation. Although this is not essential to my invention, it will be found useful in certain cases.

In Fig. 4 the main generator is simplified by eliminating all but its main field winding 3. This is separately excited as before but the differential exciter 6 is connected in series with it so as to act as a counter E. M. F. generator. The excitation circuit for exciter 6 is substantially the same as in Fig. 3. With this arrangement the current in the field winding 3 will be decreased with increases in load on the main generator by reason of the increase in counter voltage of the exciter 6 as the load current of the main generator increases. In this manner the desired differential compounding characteristic is obtained.

In Fig. 5 the exciter 6 is provided with opposed field windings, one of which is the field winding 7 which is controlled in accordance with load current on the main generator and the other of which is a separately-energized field winding 15. The exciter 6 is connected to provide all of the energizing current for the main field winding 3. With this arrangement the voltage of the exciter 6 will be a maximum at no load on the main generator and consequently the voltage of the main generator will be a maximum under this condition. As the load current of the main generator increases, the differential excitation of the exciter 6 is increased by reason of the increases in current in the differential field winding 7. Consequently, the excitation of the main generator decreases so as to produce the dropping or shovel generator characteristic which is desired. In this figure the duty on the non-linear resistor has been still further decreased by connecting it in series with the field winding 13 of the pilot exciter 12.

The relationship between the exciters 6 and 12 may be described as a cascade relationship in that the output of the pilot exciter 12 in each case is fed into the input or exciting circuit for the main exciter 6.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a dynamo-electric generator, compounding means for said generator, and a symmetrically-conducting non-linear volt-ampere characteristic impedance means for decreasing the effect of said compounding means at low generator currents and increasing the effect of said compounding means at high generator currents whereby the volt-ampere characteristic of said generator has an intermediate portion of substantially greater curvature than the remainder thereof, said impedance means being connected in series circuit relation with said compounding means so as to carry a current which is proportional to the current of said generator.

2. In combination, a dynamo-electric generator, means for differentially compounding said generator, and means for increasing the working area under said generator's volt-ampere curve comprising a symmetrically-conducting non-linear impedance-current characteristic impedance means, said impedance means being connected in series circuit relation with said compounding means so as to carry a current which is proportional to the current of said generator.

3. In combination, a dynamo-electric generator, means for differentially compounding said generator, and means for reducing the no-load voltage of said generator without reducing its maximum output power comprising a symmetrically-conducting non-linear impedance-current characteristic impedance connected to be traversed by the current in said compounding means, said impedance means being connected in series circuit relation with said compounding means so as to carry a current which is proportional to the current of said generator.

4. In combination, a dynamo-electric generator, a differential compounding circuit for said generator, and means for both reducing the no-load voltage and increasing the maximum safe power output of said generator comprising a fast acting exponential type negative impedance-current characteristic impedance effectively serially connected in said differential compounding circuit so as to carry a current which is proportional to the current of said generator.

5. In combination, an electric motor, a source of current supply connected thereto, and means responsive to abnormally high motor current for reducing the voltage of said source of supply so as to prevent injuriously overloading said motor, said means including an inverse impedance-current characteristic impedance.

6. In combination, an electric motor, a source of current supply connected thereto, and means responsive to abnormally high motor current for reducing the voltage of said source of supply so as to prevent injuriously overloading said motor, said means including an instantaneously acting substantially temperature independent inverse resistance-current characteristic resistor characterized by the relation $RI^a=C$ where R is its resistance, I is the current through it, $a$ is an exponent determined by its manufacture and C is a constant determined by its physical dimensions.

7. In an electric shovel, a separately-excited direct-current motor for moving the scoop, a separately-excited direct-current main generator for supplying operating current to said motor, a house exciter circuit for supplying exciting current to said motor and generator, a differential field winding for said main generator, a separately excited exciter for energizing said differential field winding, said exciter having a main field winding which is effectively connected in series with said motor and main generator, and a non-linear resistor connected in series with said exciter and differential field winding, said resistor having a resistance-current relation $R=C/I^a$ where R is its resistance in ohms, C is a constant, I is the current through it in amperes and $a$ is an exponent.

8. An electric power supply system and drive for a widely variable torque mechanical load comprising, in combination, a driving motor, a main generator connected to supply operating current to said motor, a main separately-excited field winding for said generator, a differential field winding for said generator, a differential series exciter having an armature connected to supply current to said differential field winding and having a field winding effectively connected in series with the main generator and driving motor, and an impedance having an inverse impedance-current characteristic connected in series with said differential field winding and the armature of said differential series exciter.

9. In combination, a direct-current generator having an armature circuit and a pair of field windings, means for energizing one of said field windings with a predetermined current, means for energizing the other of said field windings with a current which varies in accordance with the armature current of said generator, said last-mentioned means comprising a series exciter having its armature connected in series circuit relation with said other field winding and having its field winding connected in series circuit relation with the armature circuit of said generator, and an inverse resistance-current characteristic resistance connected in series with the armature of said exciter and said other field winding of said generator.

10. In combination, a direct-current generator having an armature circuit and a pair of field windings, means for energizing one of said field windings with a predetermined current, means for energizing the other of said field windings with a current which varies in accordance with the armature current of said generator, said last-mentioned means comprising a series exciter having its armature connected in series circuit relation with said other field winding and having its field winding connected in series circuit relation with the armature circuit of said generator, and an inverse resistance-current characteristic resistance connected in series with the armature of said exciter and said other field winding of said generator, said resistor characteristic being defined by the equation $RI^a=C$ where R is its resistance, I is the current through it, $a$ is an exponent determined by its manufacture and C is a constant determined by its physical dimensions.

11. In combination, a main generator, a differential compounding circuit therefor including a plurality of cascaded exciters, and a current-dependent resistor serially connected in the excitation circuit of one of said exciters, said resistor obeying the formula $RI^a=C$ where R is its resistance, I is its current, $a$ is an exponent and C is a constant.

BRUCE D. MICKEY.